UNITED STATES PATENT OFFICE.

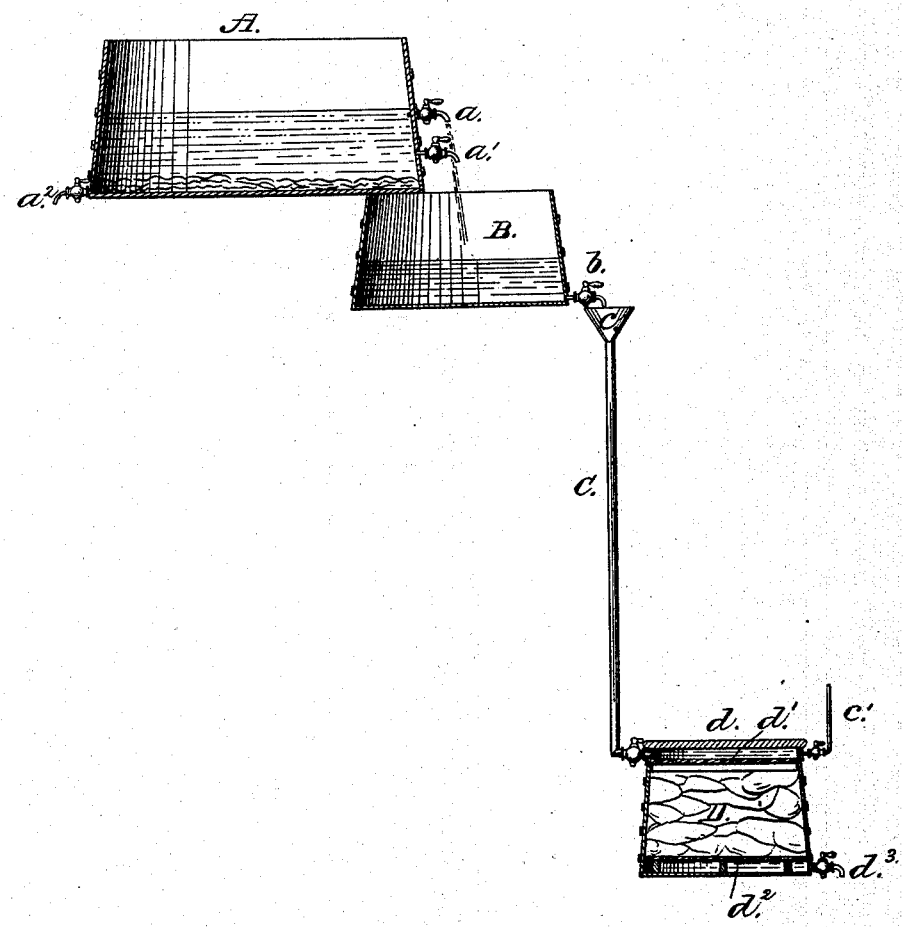

MAGNUS GROSS, OF WASHINGTON, DISTRICT OF COLUMBIA.

IMPROVEMENT IN PRESERVING FLESH AND MEATS.

Specification forming part of Letters Patent No. 26,427, dated December 13, 1859.

*To all whom it may concern:*

Be it known that I, MAGNUS GROSS, of Washington city, District of Columbia, have invented a new and Improved Apparatus for Curing or Salting Meat and Fish; and I do hereby declare that the following is a full and exact description thereof, reference being had to the annexed drawing, and letters of reference thereon.

The nature of my invention consists in the application of an air-tight apparatus for displacement, to which hydrostatic pressure is applied.

To enable others to make use of my invention and improvement, I shall proceed to describe its construction and operation, and explain the principles upon which, in my estimation, the process of salting or curing meat should be based, as these principles have more or less been misunderstood or misconstrued by all the inventors or patentees whose methods and machines I had occasion to examine.

It is an established fact that decomposition or putrefaction of animal bodies commences immediately after life is extinct. It has further been ascertained that the peculiar process of decomposition, or, chemically speaking, of combustion of animal bodies, which is called "putrefaction" requires the presence of oxygen and moisture at a temperature above zero. Hence, in contact with atmospheric air and water animal bodies will putrefy; hence the principal condition of preserving any kind of fresh meat for domestic purposes consists in the removal of the nearly seventy per cent. of water which it contains. To effect this, meat is either thoroughly dried or its water combined with some substance which possesses not only a powerful affinity for water, but strong antiseptic properties besides.

The old process of smoking and the more recently-introduced methods of the French answer the first, salting the latter purpose, and it is the common salt which is most generally in use, on account of its antiseptic properties as well as its agreeable and universally-popular taste. That meat therefore is cured best, as regards the process of salting, with which alone I have to deal, whose percentage of water is totally saturated by a common salt of highly antiseptic properties.

Any method of salting, no matter how ingenious and complete an apparatus or machinery is used, must therefore be considered unsatisfactory whose advantages solely consist in the saving of time and labor; for although a thorough permeation of the meat is necessary under all circumstances, the full object of the process of curing is only then attained when a pure and strong chloride of sodium—that is, an antiseptic common salt—is applied; but while I admit that the better qualities of the so-called "solar" salt would answer that purpose, it has to be borne in mind that in consequence of the turns of trade and commerce of the twenty and odd million bushels annually consumed, but four million bushels are solar salt, and of these two and a half million bushels only of such quality as would fully correspond to the object in view. Small, however, as this available quantity of really good salt appears, it is sufficient, with my mode of salting, to cure nearly one thousand million pounds of beef and pork, as will be made apparent in the course of this specification.

All the boiled salt, of which about seventeen million bushels are annually consumed, contains alkaline earths—combinations of calcium and magnesia in particular—to such an extent as not only to impair its antiseptic properties, but to render it actually septic, as has been proved; and, to make the case still worse, lime is, for the sake of better appearance, artificially mixed to those varieties of salt which are most in use—as, for instance, the New York, Kanawha, and Liverpool salt. Such a salt is not only totally unfit to cure and preserve meat, but lacks, in consequence of its long-continued boiling, the "spirits of salt," as the combining chloric acid has been called in technics.

In order, now, to secure a satisfactory—that is, a curative—medium, as well as to apply an apparatus which is saving time and labor, comparatively cheap, and capable of being attached to any slaughter or packing house of greater or smaller dimensions, an apparatus in particular that, by its simple construction, comes nearest to the vessels most commonly in use, and the handling of which does not require any engineering or mechanical skill on the part of the operator, I proceed as follows:

Figure A of the drawing represents a vessel made of white pine or oak, and capable of holding about twice the quantity of liquid as the cylinder D. $a$, $a'$, and $a^2$ are cocks attached to the vessel or tub A at various distances. This tub is to receive a solution of any cheap and available kind of bay, Liverpool, New York, or Kanawha salt.

As one part of salt dissolves in three parts of water at a temperature above the freezing-point, one hundred and twenty-five pounds of salt will be sufficient to saturate three hundred pounds (say forty gallons) of water. A solution of salt in such proportion having been effected by means of the necessary stirring with a wooden spatula, I convert the impure and septic liquid into a purer and antiseptic solution of chloride of sodium by adding to each one hundred pounds of salt four pounds of previously-dissolved or powdered carbonate of soda and two pounds of carbonate of potash, whereupon the disengagement of the alkaline earths will take place in consequence of the transformation of the soluble sulphates, phosphates, and muriates of calcium and magnesia into insoluble carbonates. The purified liquid is left to settle, and when used let off by means of cocks $a$ and $a'$, while cock $a^2$ serves for cleaning the tub.

Vessel B receives the liquid from vessel A. It is made of the same material and about one-third larger than cylinder D. To every one hundred pounds of the clarified solution contained in it half a pound of muriatic acid is added, in order to impart the wanting spirits of salt. Now the saturate solution of an antiseptic chloride of sodium is ready for use and brought down through the hydrostatic pipe C to the salting-cylinder D, inside of which two perforated disks are resting, respectively, on cross-bars about three inches above the bottom of the cylinder and on a strong hoop or iron ring from three to four inches below the top of the same, between which disks the meat is packed with so much good bay or solar salt as will correspond to the saturation of its seventy per cent. of water—that is, from twenty-five to thirty pounds of the salt to every one hundred pounds of meat.

Between the upper disk, $d'$, and the solid and air-tight fitting lid $d$ the hydrostatic pipe C is inserted, while on the opposite side and closer to the lid a small tube, $c'$, for the passage of the air, is attached. As soon as the apparatus is filled the air-tube is opened and the solution in tub B let on by turning cock $b$ till the apparatus is filled and the air escaped, the one indicating itself by the solution ascending into tube $c'$, the other by the liquid being at a *niveau* with funnel $c$. Through $d^3$ the pickle is let off to be carried over a filter (charcoal-filter, if required) into tub B again, as this pickle must invariably constitute a concentrated solution of chloride of sodium thoroughly fit for further use. Not a particle of the brine or salt must be lost.

The strength of the (toward the top slightly inclined) cylinder or salting-tub is altogether depending on its size, or, more properly, on the hydrostatic force which is to be applied. Thus cylinders may be constructed capable of holding from five hundred up to ten thousand pounds of meat, or of bearing a pressure from five thousand up to forty thousand pounds and more. As to the diameter of the cylinder it is, however, not practicable to go beyond six feet, else the difficulties of securing (screwing) lid $d$ air-tight may become too great. The pipe C is likewise varying in diameter and length. It may be made of tin-sheet one and a half inch in diameter and twelve feet high, as well as iron gas-pipes of two or three inches in diameter and twenty-four feet high may be used.

A column of water measuring one square inch and one foot in depth presses on a base of one square inch with a weight of 0.4328 pounds, and on a base of one square foot ($0.4328 \times 144$) with a weight of 62,3232 pounds. If, therefore, applying this principle to my apparatus, the base of a cylinder is four feet square and the length of pipe C twenty feet, any liquid or solid body within the cylinder will be under a pressure of ($62.3232 \times 80$) 4,985.856 pounds at the top of the cylinder, which may be said to be two feet and six inches high, and of 5,484.4416 pounds at the base or bottom of it. This is about the smallest size of an apparatus applicable to practical purposes, and with such a one I have made my experiments. Supposing the pipe C to be twenty-four feet high, the cylinder eight feet high and measuring twenty-four feet square at its lower perforated disk, the pressure on that point will amount to 47,763.2176 pounds.

As soon as an apparatus of the foregoing description is properly filled (the air-tube being disconnected as soon as the liquid ascends into the same) the hydrostatic force is left to operate on the meat within the cylinder for about three hours, whereupon the cocks $b$ and $d^3$ are turned in such manner as to maintain the pressure by keeping the solution of salt at its *niveau* in the funnel $c$, while so much of it is passing off through cock $d^3$ as may correspond to one-third of the capacity of the cylinder, which operation I call the "displacement of the brine." The apparatus is thereupon again left to itself for a couple of hours, when the operation of displacement is repeated in the same wise. Three hours more rest are then sufficient to complete the process of salting. The meat, which is now taken out, is thoroughly and uniformly salted, as will be shown by the dipping of any splinter split from the center of the thickest bone, as well as of muscles and flesh particles cut out from where it seems most difficult to the brine to penetrate, in a very diluted solution of nitrate of silver, which will indicate the presence of common salt to a comparatively large quantity. Thus an apparatus in good working order is capable of performing the operation of salting twice at least within twenty-four hours. Any kind of meat thus cured can be wrapped in dry bay salt, packed and shipped immediately.

The appearance of the meat is fresher, though the deleterious saltpeter has not been used. It keeps better and longer, and its taste is infinitely more relishing.

It is self-understood that this mode of curing can be practiced in a moderately cool place all the year through.

After having furnished in the foregoing what I think to be a sufficiently clear and intelligible description of my process and apparatus for salting or curing meat and fish,

I claim and desire to have secured by Letters Patent—

The application of an air-tight apparatus of displacement, to which hydrostatic pressure is applied, for the purpose and in the manner set forth in the specification.

MAGNUS GROSS.

Witnesses:
MICHAEL BRIEL,
R. WM. HEILERMANN.